(12) United States Patent  
Xiong et al.

(10) Patent No.: US 10,225,246 B2  
(45) Date of Patent: Mar. 5, 2019

(54) CERTIFICATE ACQUIRING METHOD AND DEVICE

(71) Applicant: Huawei Technologies Co., Ltd., Shenzhen (CN)

(72) Inventors: Ying Xiong, Shenzhen (CN); Jiangsheng Wang, Shenzhen (CN); Chengyan Feng, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 234 days.

(21) Appl. No.: 15/346,357

(22) Filed: Nov. 8, 2016

(65) Prior Publication Data

US 2017/0054710 A1 Feb. 23, 2017

Related U.S. Application Data

(63) Continuation of application No. PCT/CN2014/077075, filed on May 8, 2014.

(51) Int. Cl.
*H04L 29/06* (2006.01)
*G06F 9/455* (2018.01)
*H04L 9/32* (2006.01)

(52) U.S. Cl.
CPC ...... *H04L 63/0823* (2013.01); *G06F 9/45558* (2013.01); *H04L 9/3268* (2013.01); *G06F 2009/45595* (2013.01)

(58) Field of Classification Search
None
See application file for complete search history.

(56) References Cited

U.S. PATENT DOCUMENTS 9,854,048 B2 * 12/2017 Rajagopal ........... G06F 9/45558
2005/0149723 A1 7/2005 Watkins et al.
(Continued)

FOREIGN PATENT DOCUMENTS

| CN | 1838593 A | 9/2006 |
|---|---|---|
| CN | 101754203 A | 6/2010 |
| CN | 102663290 A | 9/2012 |
| CN | 103036854 A | 4/2013 |
| CN | 103475485 A | 12/2013 |

(Continued)

OTHER PUBLICATIONS

"Network Functions Virtualization (NFV); NFV Security; Security and Trust Guidance", Oct. 2014, Draft ETSI GS NFV-SEC 003 V1.1.1, p. 1-58.*

(Continued)

*Primary Examiner* — Christopher A Revak
(74) *Attorney, Agent, or Firm* — Leydig, Voit & Mayer, Ltd.

(57) ABSTRACT

The embodiments of the present invention disclose a certificate acquiring method and device. A virtualized network function manager (VNFM) receives a certificate application proxy message sent by a virtualized network function (VNF) instance. The VNFM uses the authentication information to authenticate the VNF instance, and when the authentication succeeds, sends a certificate application message to a certificate authority (CA). Then the VNFM receives a certificate issued by the CA, and sends the certificate to the VNF instance. In this way, through a trusted link between the VNFM and the certificate authority, the instantiated VNF instance applies for a certificate issued by the certificate authority, thereby effectively ensuring security of a management channel between the VNF instance and the VNFM.

16 Claims, 8 Drawing Sheets

(56) References Cited

U.S. PATENT DOCUMENTS

| | | | |
|---|---|---|---|
| 2005/0188220 A1* | 8/2005 | Nilsson | H04L 63/04 726/5 |
| 2005/0216733 A1* | 9/2005 | Keohane | H04L 63/0869 713/156 |
| 2006/0200857 A1 | 9/2006 | Yokota | |
| 2008/0066181 A1 | 3/2008 | Haveson et al. | |
| 2008/0126794 A1* | 5/2008 | Wang | H04L 63/0464 713/151 |
| 2010/0250952 A1 | 9/2010 | Pang et al. | |
| 2011/0197062 A1* | 8/2011 | De Gaetano | H04L 63/0823 713/167 |
| 2013/0298210 A1 | 11/2013 | Wright et al. | |
| 2013/0305042 A1 | 11/2013 | Cho | |
| 2014/0195800 A1* | 7/2014 | Sabin | H04L 9/3268 713/156 |
| 2015/0156193 A1* | 6/2015 | Chen | H04L 63/0823 713/156 |
| 2015/0319179 A1* | 11/2015 | Miasojed | H04L 63/105 726/1 |
| 2016/0119374 A1* | 4/2016 | Williams | H04L 63/1441 713/175 |
| 2016/0197933 A1* | 7/2016 | Lapidous | H04L 63/0428 726/26 |
| 2016/0277372 A1* | 9/2016 | Shah | H04L 63/061 |

FOREIGN PATENT DOCUMENTS

| | | | |
|---|---|---|---|
| JP | 2005086445 | A | 3/2005 |
| JP | 2008005090 | A | 1/2008 |
| JP | 2011503977 | A | 1/2011 |
| JP | 2014082584 | A | 5/2014 |
| KR | 20050071359 | A | 7/2005 |
| RU | 2371757 | C2 | 10/2009 |
| RU | 2440681 | C2 | 1/2012 |

OTHER PUBLICATIONS

Ajay Simha, "NFV reference architecture for deployment of mobile networks", Jan. 2017, Red Hat Reference Architecture Series, Version 1.3, p. 1-66.*

"Observation to NFV", 2014, White Paper—Huawei, p. 1-16.*

Venkatachalam, "NFV/SIDN Impacts to 3GPP," SP-140120, Intel Corporation (2014).

"Network Functions Virtualisation (NFV); NFV Security; Problem State," Draft ETSI GS NFV-SEC 001, V0.0.9, pp. 1-38 (Jan. 2014).

"NFV certificate hierarchy," ETSI NFVMAN(14)0000xx, Huawei Technologies (Apr. 2014).

"Network Functions Virtualisation (NFV); Architectural Framework," ETSI GS NFV 002 V1.1.1, (Oct. 2013).

* cited by examiner

CERTIFICATE ACQUIRING METHOD AND DEVICE

CROSS-REFERENCE TO RELATED APPLICATIONS

This application is a continuation of International Application No. PCT/CN2014/077075, filed on May 8, 2014, the disclosure of which is hereby incorporated by reference in its entirety.

TECHNICAL FIELD

The embodiments of the present invention relates to the field of virtual network deployment, and in particular, to a certificate acquiring method and device.

BACKGROUND

Network function virtualization (NFV) is a standardization organization founded for a purpose of "virtualizing conventional networks," and has developed a set of standards for network deployment in a virtualized environment. The standards developed by the NFV organization can implement network virtualization, flexible deployment, and the like.

A virtual network architecture developed by the NFV includes an element management system (EMS), an NFV orchestrator (NFVO), a virtualized network function (VNF) instance, a VNF manager (VNFM), an NFV infrastructure (NFVI), and a virtualized infrastructure manager (VIM) in a VNF framework.

The EMS, which is a conventional network element manager, is configured to manage a VNF instance as a network element, where the VNF instance is obtained by instantiation; the NFVO is configured to orchestrate a VNF; the VNF instance is a virtualized network element that runs a network function; the VNFM is configured to manage the VNF; the NFVI includes virtualized computing resources, virtualized storage resources, virtualized network resources, and the like; the VIM is configured to manage the NFVI according to instructions of the NFVO and the VNFM.

The EMS or the VNFM manages the VNF by establishing a management channel to the VNF. To prevent a malicious user from attacking a network, both parties need to be authenticated when a management channel is established between the EMS or the VNFM and the VNF. Generally, the authentication is performed by using a transport layer security technology (that is, by using a certificate). That is, a certificate is used as a proof of authentication to perform authentication operations on both parties.

However, in a conventional network, manners of acquiring a certificate include but are not limited to the following two manners:

First Manner:

An initial certificate bound to hardware is imported manually or at initial installation of hardware or software, and then a desired certificate is acquired by using the initial certificate and a certificate management protocol.

However, in the NFV standards, a VNF is automatically generated on a VM and is unable to obtain a certificate in the first manner, which leads to poor security of a management channel established between an EMS or a VNFM and the VNF.

Second Manner:

When a network element is generated, a vendor of the network element sets a vendor certificate in the network element. Therefore, when the network element is initially configured, the network element uses a certificate management protocol to apply to a public key system (PKI) of an operator for a certificate issued by the operator. In a process of applying for the certificate, the network element uses the vendor certificate as its identity proof, so that the PKI trusts the network element and issues the operator certificate.

However, in a virtualized environment, a VNF is generated dynamically and is thus unable to apply for a certificate in the second manner, which leads to poor security of a management channel established between an EMS or a VNFM and the VNF.

SUMMARY

In view of this, embodiments of the present invention provide a certificate acquiring method and device to solve a problem of poor security of a management channel established between an EMS or a VNFM and a VNF.

According to a first aspect of the present invention, a certificate acquiring device is provided, including:

a receiving module, configured to receive a certificate application proxy message sent by a VNF instance, where the certificate application proxy message includes authentication information and certificate application information that is used for certificate application, where the authentication information is used to establish a channel for certificate proxy-application between the VNF instance and a virtualized network function manager (VNFM); and a sending module, configured to use the authentication information received by the receiving module to authenticate the VNF instance, and when the authentication succeeds, send a certificate application message to a certificate authority (CA), where the certificate application message includes the certificate application information that is used for certificate application, where the receiving module is further configured to receive a certificate issued by the CA; and the sending module is further configured to send the certificate received by the receiving module to the VNF instance, where the certificate is generated by the CA according to the certificate application information that is used for certificate application and included in the certificate application message.

With reference to a possible implementation manner of the first aspect of the present invention, in a first possible implementation manner, the authentication information is a temporary certificate, where the temporary certificate is applied for from the VNFM when a network function virtualization orchestrator (NFVO) determines a need to instantiate the VNF instance and is transmitted to the VNF instance through a virtualized infrastructure manager (VIM) in a VNF framework, an NFV infrastructure (NFVI), and a virtual machine (VM) on which the VNF runs.

With reference to the first possible implementation manner of the first aspect of the present invention, in a second possible implementation manner, the sending module is specifically configured to: compare a received temporary certificate with the temporary certificate that is applied for from the VNFM when the NFVO determines the need to instantiate the VNF instance; and when it is determined that the received temporary certificate is the same as the temporary certificate that is applied for from the VNFM when the NFVO determines the need to instantiate the VNF instance, determine that the authentication on the VNF instance succeeds; or when it is determined that the received temporary certificate is different from the temporary certificate that is applied for from the VNFM when the NFVO determines the need to instantiate the VNF instance, determine that the authentication on the VNF instance fails.

With reference to a possible implementation manner of the first aspect of the present invention, in a third possible implementation manner, the authentication information is a pre-shared key (PSK), where the PSK is generated when a network function virtualization orchestrator (NFVO) determines a need to instantiate the VNF instance and is transmitted to the VNF instance through a virtualized infrastructure manager (VIM) in a VNF framework, an NFV infrastructure (NFVI), and a virtual machine (VM) on which the VNF runs.

With reference to the third possible implementation manner of the first aspect of the present invention, in a fourth possible implementation manner, the receiving module is specifically configured to send the PSK to the VNF instance and receive the certificate application proxy message sent by the VNF instance, where the certificate application proxy message is sent to the VNFM when the VNF instance determines that a locally injected PSK is the same as or associated with the received PSK sent by the VNFM.

With reference to the fourth possible implementation manner of the first aspect of the present invention, in a fifth possible implementation manner, the sending module is specifically configured to: compare the received PSK with a PSK that is issued when the NFVO determines the need to instantiate the VNF instance; and when it is determined that the received PSK is the same as or associated with the PSK that is issued when the NFVO determines the need to instantiate the VNF instance, determine that the authentication on the VNF instance succeeds; or when it is determined that the received PSK is different from or unassociated with the PSK that is issued when the NFVO determines the need to instantiate the VNF instance, determine that the authentication on the VNF instance fails.

With reference to a possible implementation manner of the first aspect of the present invention, or with reference to the first possible implementation manner of the first aspect of the present invention, or with reference to the second possible implementation manner of the first aspect of the present invention, or with reference to the third possible implementation manner of the first aspect of the present invention, or with reference to the fourth possible implementation manner of the first aspect of the present invention, or with reference to the fifth possible implementation manner of the first aspect of the present invention, in a sixth possible implementation manner, the device further includes:

a channel establishing module, configured to: when the certificate is sent to the VNF instance, use the certificate to establish a management channel to the VNF instance.

According to a second aspect of the present invention, a certificate acquiring device is provided, including:

a receiving module, configured to receive a certificate application proxy message sent by a virtualized infrastructure manager (VIM) in a VNF framework, where the certificate application proxy message includes a VNF instance that requests certificate application, and certificate application information used by the VNF instance for certificate application; and a sending module, configured to send a certificate application message to a certificate authority (CA), where the certificate application message includes the certificate application information received by the receiving module and used by the VNF instance for certificate application, where the receiving module is further configured to receive a certificate issued by the CA; and the sending module is further configured to send the certificate received by the receiving module to the VIM, where the certificate is generated by the CA according to the certificate application information used by the VNF instance for certificate application and included in the certificate application message.

With reference to a possible implementation manner of the second aspect of the present invention, in a first possible implementation manner, the certificate application proxy message is generated by the VIM according to the received certificate application information, where the certificate application information is obtained by the VNF instance according to an initialization parameter and sent by the VNF instance to a VM and then sent by the VM to the VIM through a secure channel to the VIM.

With reference to the first possible implementation manner of the second aspect of the present invention, in a second possible implementation manner, the initialization parameter includes CA information and a domain name of a certificate management domain and is obtained when a network function virtualization orchestrator (NFVO) determines to instantiate the VNF instance.

According to a third aspect of the present invention, a certificate acquiring device is provided, including:

a receiving module, configured to receive a certificate application message sent by a virtualized network function VNF instance, where the certificate application message includes a temporary certificate and certificate application information that is used for certificate application, where the temporary certificate is applied for from a CA when a network function virtualization orchestrator (NFVO) determines a need to instantiate the VNF instance and is transmitted to the VNF instance through a virtualized infrastructure manager (VIM) in a VNF framework, an NFV infrastructure (NFVI), and a virtual machine (VM) on which the VNF runs; and an issuing module, configured to use the temporary certificate received by the receiving module to authenticate the VNF instance, and when the authentication succeeds, issue a certificate to the VNF instance according to the certificate application information that is used for certificate application and included in the certificate application message.

According to a fourth aspect of the present invention, a certificate acquiring device is provided, including:

a receiving module, configured to receive a certificate application message sent by a virtual machine (VM), where the certificate application message includes a public key used for certificate application; and a sending module, configured to send a certificate application proxy message to a certificate authority (CA), where the certificate application proxy message includes the public key received by the receiving module and used by the VM for certificate application, where the receiving module is further configured to receive a certificate issued by the CA; and the sending module is further configured to send the certificate received by the receiving module to the VM, where the certificate is obtained by the CA by signing according to the public key used by the VM for certificate application and included in the certificate application proxy message.

With reference to a possible implementation manner of the fourth aspect of the present invention, in a first possible implementation manner, the sending module is specifically configured to send the certificate application proxy message to a virtualized infrastructure manager (VIM) in a virtualized network function framework, so that the VIM forwards the certificate application proxy message to the certificate authority (CA).

With reference to a possible implementation manner of the fourth aspect of the present invention, or with reference to the first possible implementation manner of the fourth aspect of the present invention, in a second possible implementation manner, the device further includes:

a channel establishing module, configured to: when the VM receives the certificate, establish a management channel between the VM and a VM manager.

With reference to a possible implementation manner of the fourth aspect of the present invention, or with reference to the first possible implementation manner of the fourth aspect of the present invention, or with reference to the second possible implementation manner of the fourth aspect of the present invention, in a third possible implementation manner, the public key is generated by the VM according to an initialization parameter, where the initialization parameter includes CA information and a domain name of a certificate management domain and is obtained when the virtualized infrastructure manager (VIM) in the virtualized network function framework receives an instruction to generate the VM, where the instruction is sent by a network function virtualization orchestrator (NFVO).

According to a fifth aspect of the present invention, a certificate acquiring device is provided, including:

a signal receiver, configured to receive a certificate application proxy message sent by a VNF instance, where the certificate application proxy message includes authentication information and certificate application information that is used for certificate application, where the authentication information is used to establish a channel for certificate proxy-application between the VNF instance and a virtualized network function manager (VNFM); and a signal transmitter, configured to use the authentication information to authenticate the VNF instance, and when the authentication succeeds, send a certificate application message to a certificate authority (CA), where the certificate application message includes the certificate application information that is used for certificate application, where the signal receiver is further configured to receive a certificate issued by the CA; and the signal transmitter is further configured to send the certificate to the VNF instance, where the certificate is generated by the CA according to the certificate application information that is used for certificate application and included in the certificate application message.

With reference to a possible implementation manner of the fifth aspect of the present invention, in a first possible implementation manner, the authentication information is a temporary certificate, where the temporary certificate is applied for from the VNFM when a network function virtualization orchestrator (NFVO) determines a need to instantiate the VNF instance and is transmitted to the VNF instance through a virtualized infrastructure manager (VIM) in a VNF framework, an NFV infrastructure (NFVI), and a virtual machine (VM) on which the VNF runs.

With reference to the first possible implementation manner of the fifth aspect of the present invention, in a second possible implementation manner, the signal transmitter is specifically configured to: compare a received temporary certificate with the temporary certificate that is applied for from the VNFM when the NFVO determines the need to instantiate the VNF instance; and when the VNFM determines that the received temporary certificate is the same as the temporary certificate that is applied for from the VNFM when the NFVO determines the need to instantiate the VNF instance, determine that the authentication on the VNF instance succeeds; or when the VNFM determines that the received temporary certificate is different from the temporary certificate that is applied for from the VNFM when the NFVO determines the need to instantiate the VNF instance, determine that the authentication on the VNF instance fails.

With reference to a possible implementation manner of the fifth aspect of the present invention, in a third possible implementation manner, the authentication information is a pre-shared key (PSK), where the PSK is generated when a network function virtualization orchestrator (NFVO) determines a need to instantiate the VNF instance and is transmitted to the VNF instance through a virtualized infrastructure manager (VIM) in a VNF framework, an NFV infrastructure (NFVI), and a virtual machine (VM) on which the VNF runs.

With reference to the third possible implementation manner of the fifth aspect of the present invention, in a fourth possible implementation manner, the signal receiver is specifically configured to send the PSK to the VNF instance and receive the certificate application proxy message sent by the VNF instance, where the certificate application proxy message is sent to the VNFM when the VNF instance determines that a locally injected PSK is the same as or associated with the received PSK.

With reference to the fourth possible implementation manner of the fifth aspect of the present invention, in a fifth possible implementation manner, the signal transmitter is specifically configured to: compare the received PSK with a PSK that is issued when the NFVO determines the need to instantiate the VNF instance; and when it is determined that the received PSK is the same as or associated with the PSK that is issued when the NFVO determines the need to instantiate the VNF instance, determine that the authentication on the VNF instance succeeds; or when it is determined that the received PSK is different from or unassociated with the PSK that is issued when the NFVO determines the need to instantiate the VNF instance, determine that the authentication on the VNF instance fails.

With reference to a possible implementation manner of the fifth aspect of the present invention, or with reference to the first possible implementation manner of the fifth aspect of the present invention, or with reference to the second possible implementation manner of the fifth aspect of the present invention, or with reference to the third possible implementation manner of the fifth aspect of the present invention, or with reference to the fourth possible implementation manner of the fifth aspect of the present invention, or with reference to the fifth possible implementation manner of the fifth aspect of the present invention, in a sixth possible implementation manner, the device further includes:

a processor, configured to: when the certificate is sent to the VNF instance, use the certificate to establish a management channel to the VNF instance.

According to a sixth aspect of the present invention, a certificate acquiring device is provided, including:

a signal receiver, configured to receive a certificate application proxy message sent by a virtualized infrastructure manager (VIM) in a VNF framework, where the certificate application proxy message includes a VNF instance that requests certificate application, and certificate application information used by the VNF instance for certificate application; and a signal transmitter, configured to send a certificate application message to a certificate authority (CA), where the certificate application message includes the certificate application information used by the VNF instance for certificate application, where the signal receiver is further configured to receive a certificate issued by the CA; and the signal transmitter is further configured to send the certificate to the VIM, where the certificate is generated by the CA according to the certificate application information used by the VNF instance for certificate application and included in the certificate application message.

With reference to a possible implementation manner of the sixth aspect of the present invention, in a first possible implementation manner, the certificate application proxy message is generated by the VIM according to the received certificate application information, where the certificate application information is obtained by the VNF instance according to an initialization parameter and sent by the VNF instance to a VM and then sent by the VM to the VIM through a secure channel to the VIM.

With reference to the first possible implementation manner of the sixth aspect of the present invention, in a second possible implementation manner, the initialization parameter includes CA information and a domain name of a certificate management domain and is obtained when a network function virtualization orchestrator (NFVO) determines to instantiate the VNF instance.

According to a seventh aspect of the present invention, a certificate acquiring device is provided, including:

a signal receiver, configured to receive a certificate application message sent by a virtualized network function VNF instance, where the certificate application message includes a temporary certificate and certificate application information that is used for certificate application, where the temporary certificate is applied for from a CA when a network function virtualization orchestrator (NFVO) determines a need to instantiate the VNF instance and is transmitted to the VNF instance through a virtualized infrastructure manager (VIM) in a VNF framework, an NFV infrastructure (NFVI), and a virtual machine (VM) on which the VNF runs; and a processor, configured to use the temporary certificate to authenticate the VNF instance, and when the authentication succeeds, issue a certificate to the VNF instance according to the certificate application information that is used for certificate application and included in the certificate application message.

According to an eighth aspect of the present invention, a certificate acquiring device is provided, including:

a signal receiver, configured to receive a certificate application message sent by a virtual machine (VM), where the certificate application message includes a public key used for certificate application; and a signal transmitter, configured to send a certificate application proxy message to a certificate authority (CA), where the certificate application proxy message includes the public key used by the VM for certificate application, where the signal receiver is further configured to receive a certificate issued by the CA; and the signal transmitter is further configured to send the certificate to the VM, where the certificate is obtained by the CA by signing according to the public key used by the VM for certificate application and included in the certificate application proxy message.

With reference to a possible implementation manner of the eighth aspect of the present invention, in a first possible implementation manner, the signal transmitter is specifically configured to send the certificate application proxy message to a virtualized infrastructure manager (VIM) in a virtualized network function framework, so that the VIM forwards the certificate application proxy message to the certificate authority (CA).

With reference to a possible implementation manner of the eighth aspect of the present invention, or with reference to the first possible implementation manner of the eighth aspect of the present invention, in a second possible implementation manner, the device further includes:

a processor, configured to: when the VM receives the certificate, establish a management channel between the VM and a VM manager.

With reference to a possible implementation manner of the eighth aspect of the present invention, or with reference to the first possible implementation manner of the eighth aspect of the present invention, or with reference to the second possible implementation manner of the eighth aspect of the present invention, in a third possible implementation manner, the public key is generated by the VM according to an initialization parameter, where the initialization parameter includes CA information and a domain name of a certificate management domain and is obtained when the virtualized infrastructure manager (VIM) in the virtualized network function framework receives an instruction to generate the VM, where the instruction is sent by a network function virtualization orchestrator (NFVO).

According to a ninth aspect of the present invention, a certificate acquiring method is provided, including:

receiving, by a virtualized network function manager VNFM, a certificate application proxy message sent by a VNF instance, where the certificate application proxy message includes authentication information and certificate application information that is used for certificate application, where the authentication information is used to establish a channel for certificate proxy-application between the VNF instance and the VNFM;

using, by the VNFM, the authentication information to authenticate the VNF instance, and when the authentication succeeds, sending a certificate application message to a certificate authority (CA), where the certificate application message includes the certificate application information that is used for certificate application; and receiving, by the VNFM, a certificate issued by the CA, and sending the certificate to the VNF instance, where the certificate is generated by the CA according to the certificate application information that is used for certificate application and included in the certificate application message.

With reference to a possible implementation manner in a ninth aspect of the present invention, in a first possible implementation manner, the authentication information is a temporary certificate, where the temporary certificate is applied for from the VNFM when a network function virtualization orchestrator (NFVO) determines a need to instantiate the VNF instance and is transmitted to the VNF instance through a virtualized infrastructure manager (VIM) in a VNF framework, an NFV infrastructure (NFVI), and a virtual machine (VM) on which the VNF runs.

With reference to the first possible implementation manner of the ninth aspect of the present invention, in a second possible implementation manner, the using, by the VNFM, the authentication information to authenticate the VNF instance includes:

comparing, by the VNFM, a received temporary certificate with the temporary certificate that is applied for from the VNFM when the NFVO determines the need to instantiate the VNF instance; and when the VNFM determines that the received temporary certificate is the same as the temporary certificate that is applied for from the VNFM when the NFVO determines the need to instantiate the VNF instance, determining that the authentication on the VNF instance succeeds; or when the VNFM determines that the received temporary certificate is different from the temporary certificate that is applied for from the VNFM when the NFVO determines the need to instantiate the VNF instance, determining that the authentication on the VNF instance fails.

With reference to a possible implementation manner in a ninth aspect of the present invention, in a third possible implementation manner, the authentication information is a pre-shared key (PSK), where the PSK is generated when a network function virtualization orchestrator (NFVO) determines a need to instantiate the VNF instance and is transmitted to the VNF instance through a virtualized infrastructure manager (VIM) in a VNF framework, an NFV infrastructure (NFVI), and a virtual machine (VM) on which the VNF runs.

With reference to the third possible implementation manner of the ninth aspect of the present invention, in a fourth possible implementation manner, the receiving, by a virtualized network function manager (VNFM), a certificate application proxy message sent by a VNF instance includes:

sending, by the VNFM, the PSK to the VNF instance, and receiving the certificate application proxy message sent by the VNF instance, where the certificate application proxy message is sent to the VNFM when the VNF instance determines that a locally injected PSK is the same as or associated with the received PSK sent by the VNFM.

With reference to the fourth possible implementation manner of the ninth aspect of the present invention, in a fifth possible implementation manner, the using, by the VNFM, the authentication information to authenticate the VNF instance includes:

comparing, by the VNFM, the received PSK with a PSK that is issued when the NFVO determines the need to instantiate the VNF instance; and when the VNFM determines that the received PSK is the same as or associated with the PSK that is issued when the NFVO determines the need to instantiate the VNF instance, determining that the authentication on the VNF instance succeeds; or when the VNFM determines that the received PSK is different from or unassociated with the PSK that is issued when the NFVO determines the need to instantiate the VNF instance, determining that the authentication on the VNF instance fails.

With reference to a possible implementation manner of the ninth aspect of the present invention, or with reference to the first possible implementation manner of the ninth aspect of the present invention, or with reference to the second possible implementation manner of the ninth aspect of the present invention, or with reference to the third possible implementation manner of the ninth aspect of the present invention, or with reference to the fourth possible implementation manner of the ninth aspect of the present invention, or with reference to the fifth possible implementation manner of the ninth aspect of the present invention, in a sixth possible implementation manner, the method further includes:

using, by the VNFM, the certificate to establish a management channel to the VNF instance when sending the certificate to the VNF instance.

According to a tenth aspect of the present invention, a certificate acquiring method is provided, including:

receiving, by a virtualized network function manager VNFM, a certificate application proxy message sent by a virtualized infrastructure manager (VIM) in a VNF framework, where the certificate application proxy message includes a VNF instance that requests certificate application, and certificate application information used by the VNF instance for certificate application;

sending, by the VNFM, a certificate application message to a certificate authority (CA), where the certificate application message includes the certificate application information used by the VNF instance for certificate application; and receiving, by the VNFM, a certificate issued by the CA, and sending the certificate to the VIM, where the certificate is generated by the CA according to the certificate application information used by the VNF instance for certificate application and included in the certificate application message.

With reference to a possible implementation manner in a tenth aspect of the present invention, in a first possible implementation manner, the certificate application proxy message is generated by the VIM according to the received certificate application information, where the certificate application information is obtained by the VNF instance according to an initialization parameter and sent by the VNF instance to a VM and then sent by the VM to the VIM through a secure channel to the VIM.

With reference to the first possible implementation manner of the tenth aspect of the present invention, in a second possible implementation manner, the initialization parameter includes CA information and a domain name of a certificate management domain and is obtained when a network function virtualization orchestrator (NFVO) determines to instantiate the VNF instance.

According to an eleventh aspect of the present invention, a certificate acquiring method is provided, including:

receiving, by a certificate authority (CA), a certificate application message sent by a virtualized network function VNF instance, where the certificate application message includes a temporary certificate and certificate application information that is used for certificate application, where the temporary certificate is applied for from a CA when a network function virtualization orchestrator (NFVO) determines a need to instantiate the VNF instance and is transmitted to the VNF instance through a virtualized infrastructure manager (VIM) in a VNF framework, an NFV infrastructure (NFVI), and a virtual machine (VM) on which the VNF runs; and using, by the CA, the temporary certificate to authenticate the VNF instance, and when the authentication succeeds, issuing a certificate to the VNF instance according to the certificate application information that is used for certificate application and included in the certificate application message.

According to a twelfth aspect of the present invention, a certificate acquiring method is provided, including:

receiving, by a network function virtualization infrastructure NFVI, a certificate application message sent by a virtual machine (VM), where the certificate application message includes a public key used for certificate application;

sending, by the NFVI, a certificate application proxy message to a certificate authority (CA), where the certificate application proxy message includes the public key used by the VM for certificate application; and receiving, by the NFVI, a certificate issued by the CA, and sending the certificate to the VM, where the certificate is obtained by the CA by signing according to the public key used by the VM for certificate application and included in the certificate application proxy message.

With reference to a possible implementation manner of the twelfth aspect of the present invention, in a first possible implementation manner, the sending, by the NFVI, a certificate application proxy message to a certificate authority (CA) includes:

sending, by the NFVI, the certificate application proxy message to a virtualized infrastructure manager (VIM) in a virtualized network function framework, so that the VIM forwards the certificate application proxy message to the certificate authority (CA).

With reference to a possible implementation manner of the twelfth aspect of the present invention, or with reference to the first possible implementation manner of the twelfth aspect of the present invention, in a second possible implementation manner, the method further includes:

establishing, when the VM receives the certificate, a management channel between the VM and a VM manager.

With reference to a possible implementation manner of the twelfth aspect of the present invention, or with reference to the first possible implementation manner of the twelfth aspect of the present invention, or with reference to the second possible implementation manner of the twelfth aspect of the present invention, in a third possible implementation manner, the public key is generated by the VM according to an initialization parameter, where the initialization parameter includes CA information and a domain name of a certificate management domain and is obtained when the virtualized infrastructure manager (VIM) in the virtualized network function framework receives an instruction to generate the VM, where the instruction is sent by a network function virtualization orchestrator (NFVO).

In the embodiments of the present invention, a VNFM receives a certificate application proxy message sent by a VNF instance, where the certificate application proxy message includes authentication information and certificate application information that is used for certificate application, where the authentication information is used to establish a channel for certificate proxy-application between the VNF instance and the VNFM; the VNFM uses the authentication information to authenticate the VNF instance, and when the authentication succeeds, sends a certificate application message to a CA, where the certificate application message includes the certificate application information that is used for certificate application; the VNFM receives a certificate issued by the CA, and sends the certificate to the VNF instance. In this way, through a trusted link between the VNFM and the certificate authority, the instantiated VNF instance applies for the certificate issued by the certificate authority, thereby effectively ensuring legality of the certificate applied for by the VNF instance and ensuring security of a management channel that is established between the VNF instance and the VNFM by using the certificate issued by the certificate authority.

BRIEF DESCRIPTION OF DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

To achieve objectives of the present invention, embodiments of the present invention provide a certificate acquiring method and device. A VNFM receives a certificate application proxy message sent by a VNF instance, where the certificate application proxy message includes authentication information and certificate application information that is used for certificate application, where the authentication information is used to establish a channel for certificate proxy-application between the VNF instance and the VNFM; the VNFM uses the authentication information to authenticate the VNF instance, and when the authentication succeeds, sends a certificate application message to a CA, where the certificate application message includes the certificate application information that is used for certificate application; the VNFM receives a certificate issued by the CA, and sends the certificate to the VNF instance. In this way, through a trusted link between the VNFM and the certificate authority, the instantiated VNF instance applies for the certificate issued by the certificate authority, thereby effectively ensuring legality of the certificate applied for by the VNF instance and ensuring security of a management channel that is established between the VNF instance and the VNFM by using the certificate issued by the certificate authority.

It should be noted that, after a VNF instance is instantiated, the instantiated VNF instance belongs to a new virtual network element and no trusted link has been established between the instantiated VNF instance and another network element in a virtual network, and the virtual network element and a certificate authority (CA) are untrusted network elements of each other. Therefore, a certificate cannot be applied for from the CA directly. In the embodiments of the present invention, by means of a certificate application proxy, the VNF instance is able to acquire a legal certificate.

The following describes the embodiments of the present invention in detail with reference to accompanying drawings in this specification.

1. Embodiment 1

Figure 1:
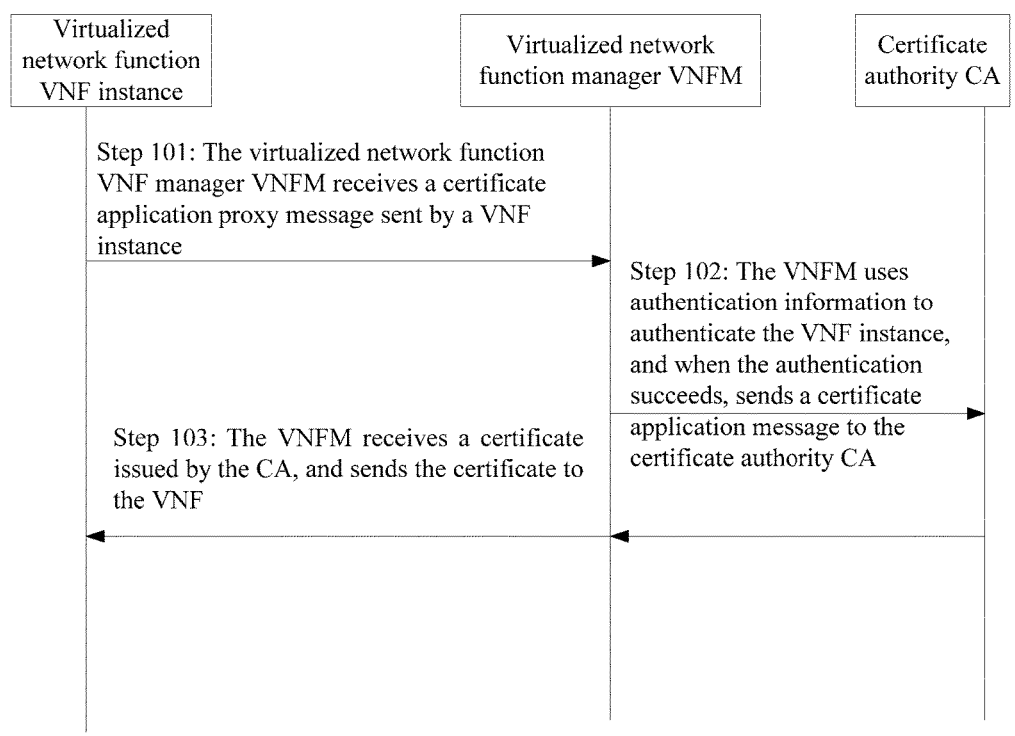
FIG. 1 is a schematic flowchart of a certificate acquiring method according to Embodiment 1 of the present invention.

As shown in FIG. 1, which is a schematic flowchart of a certificate acquiring method according to Embodiment 1 of the present invention, the method may be described as follows:

Step 101: A virtualized network function VNF manager VNFM receives a certificate application proxy message sent by a VNF instance.

The certificate application proxy message includes authentication information and certificate application information that is used for certificate application, where the authentication information is used to establish a channel for certificate proxy-application between the VNF instance and the VNFM.

It should be noted that the certificate application information includes a certificate format, a domain name, certificate authority information, and the like.

In step 101, in a virtual network, after the VNF is instantiated, it is necessary to apply for a certificate for the instantiated VNF instance in order to ensure security of communication between the instantiated VNF instance and other virtual network elements.

Specifically, when receiving an instruction to instantiate the VNF instance, an NFVO determines authentication information that is subsequently used to establish a channel for certificate proxy-application between the VNF instance and the VNFM, adds the determined authentication information into the instruction to instantiate the VNF and sends the instruction to a VIM. The VIM sends the instruction to instantiate the VNF to an NFVI, and requests the NFVI to allocate a VM to the VNF instance to implement VNF instantiation.

When allocating the VM to the VNF instance and implementing the VNF instantiation, the NFVI injects the determined authentication information, which is carried in the instruction to instantiate the VNF, into the VNF instance.

Optionally, forms of the authentication information include but are not limited to the following forms:

Scenario 1:

The authentication information is a temporary certificate.

The temporary certificate is applied for from the VNFM when the network function virtualization orchestrator (NFVO) determines a need to instantiate the VNF instance and is transmitted to the VNF instance through the virtualized infrastructure manager (VIM) in a VNF framework, the NFV infrastructure (NFVI), and the virtual machine (VM) on which the VNF runs.

It should be noted that the temporary certificate, which is applied for from the VNFM when the network function virtualization orchestrator (NFVO) determines the need to instantiate the VNF instance, is generated by the VNFM in a special manner. The temporary certificate generated by the VNFM is trusted only by the VNFM and other network elements in the virtual network do not trust the temporary certificate.

Optionally, the temporary certificate is applied for from a CA when the network function virtualization orchestrator (NFVO) determines the need to instantiate the VNF instance and is transmitted to the VNF through the virtualized infrastructure manager (VIM) in a VNF framework, the NFV infrastructure (NFVI), and the virtual machine (VM) on which the VNF runs.

A precondition for applying for the temporary certificate from the CA when the network function virtualization orchestrator (NFVO) determines the need to instantiate the VNF instance is:

The CA obtains the temporary certificate in a special manner (for example, by using a specific public or private key to sign the temporary certificate), and the temporary certificate is trusted only by the CA while other network elements do not trust the temporary certificate.

When the temporary certificate is transmitted between the VNFO, the VIM, and the NFVI, a private key corresponding to the temporary certificate may also be transmitted. However, a security risk exists in transmission of the private key between multiple network elements. Therefore, in this embodiment, security of communication between the VNFO, the VIM, and the NFVI needs to be ensured, so as to prevent leakage of the private key used for certificate application. In addition, the temporary certificate can be used only once in this embodiment so as to prevent a risk that the temporary certificate is acquired by a malicious network element in a process of repeated use, which further ensures security of communication between network elements in the virtual network.

Scenario 2:

The authentication information is a pre-shared key (PSK).

The PSK is generated when the network function virtualization orchestrator (NFVO) determines a need to instantiate the VNF instance and is transmitted to the VNF instance through the virtualized infrastructure manager (VIM) in a VNF framework, the NFV infrastructure (NFVI), and the virtual machine (VM) on which the VNF runs.

It should be noted that the pre-shared key is generated by the NFVO and sent to the VNFM, so that initial communication between the VNF instance and the VNFM is performed by using the PSK.

It should be noted that the pre-shared key is preconfigured for two ends that need to communicate, and the two ends of communication establishes communication by using the pre-shared key. The pre-shared key may be a symmetrical key, that is, keys held by both ends of communication are the same; or the pre-shared key may be an asymmetrical key, that is, keys held by both ends of communication are different, for example, a public-private key pair.

To ensure legality of a certificate that is applied for, the VNF instance applies for a certificate by using a certificate application proxy.

In this case, the VNF instance may apply for the certificate by using the determined authentication information and the certificate application information that is used for certificate application.

The VNF instance sends the certificate application proxy message to the VNFM, where the certificate application proxy message includes the authentication information and the certificate application information that is used for certificate application.

It should be noted that, assuming that the authentication information received by the VNF instance is a pre-shared key (PSK), in order to ensure legality of an identity of the certificate application proxy VNFM, the VNF instance needs to use the pre-shared key to authenticate the VNFM before sending certificate application proxy information to the VNFM.

Specifically, the VNFM sends a locally stored pre-shared key (PSK) to the VNF instance, and receives the certificate application proxy message sent by the VNF instance, where the certificate application proxy message is sent to the VNFM when the VNF instance determines that a locally injected PSK is the same as or associated with the received PSK sent by the VNFM.

Step 102: The VNFM uses authentication information to authenticate the VNF instance, and when the authentication succeeds, sends a certificate application message to a certificate authority (CA).

The certificate application message includes the certificate application information that is used for certificate application.

In step 102, manners of using, by the VNFM, the authentication information to authenticate the VNF instance include but are not limited to:

Assuming that the authentication information is the temporary certificate described in scenario 1 in step 101, when receiving the temporary certificate included in the certificate application proxy message, the VNFM compares the received temporary certificate with the temporary certificate that is applied for from the VNFM when the NFVO determines the need to instantiate the VNF instance; and when the VNFM determines that the received temporary certificate is the same as the temporary certificate that is applied for from the VNFM when the NFVO determines the need to instantiate the VNF instance, it is determined that the authentication on the VNF instance succeeds; or when the VNFM determines that the received temporary certificate is different from the temporary certificate that is applied for from the VNFM when the NFVO determines the need to instantiate the VNF instance, it is determined that the authentication on the VNF instance fails.

Assuming that the authentication information is the pre-shared key described in scenario 2 in step 101, when receiving the PSK included in the certificate application proxy message, the VNFM compares the received PSK with a PSK that is issued when the NFVO determines the need to instantiate the VNF instance; and when the VNFM determines that the received PSK is the same as or associated with the PSK that is issued when the NFVO determines the need to instantiate the VNF instance, it is determined that the authentication on the VNF instance succeeds; or when the VNFM determines that the received PSK is different from or unassociated with the PSK that is issued when the NFVO determines the need to instantiate the VNF instance, it is determined that the authentication on the VNF instance fails.

Step 103: The VNFM receives a certificate issued by the CA, and sends the certificate to the VNF instance.

The certificate is generated by the CA according to the certificate application information that is used for certificate application and included in the certificate application message.

In step 103, when receiving the certificate issued by the CA, the VNFM determines that the temporary certificate or the pre-shared key is invalid, where the temporary certificate is applied for from the VNFM or the CA when the network function virtualization orchestrator (NFVO) determines the need to instantiate the VNF instance, and the pre-shared key is generated when the network function virtualization orchestrator (NFVO) determines the need to instantiate the VNF instance. This means that the temporary certificate or the pre-shared key is no longer trusted by the VNFM when the certificate issued by the CA is received.

In this embodiment of the present invention, the method further includes:

using, by the VNFM, the certificate to establish a management channel to the VNF instance when sending the certificate to the VNF instance.

According to the solution in Embodiment 1 of the present invention, a VNFM receives a certificate application proxy message sent by a VNF instance, where the certificate application proxy message includes authentication information and certificate application information that is used for certificate application, where the authentication information is used to establish a channel for certificate proxy-application between the VNF instance and the VNFM; the VNFM uses the authentication information to authenticate the VNF instance, and when the authentication succeeds, sends a certificate application message to a CA, where the certificate application message includes the certificate application information that is used for certificate application; the VNFM receives a certificate issued by the CA, and sends the certificate to the VNF instance. In this way, through a trusted link between the VNFM and the certificate authority, the instantiated VNF instance applies for the certificate issued by the certificate authority, thereby effectively ensuring legality of the certificate applied for by the VNF instance and ensuring security of a management channel that is established between the VNF instance and the VNFM by using the certificate issued by the certificate authority.

2. Embodiment 2

Figure 2:
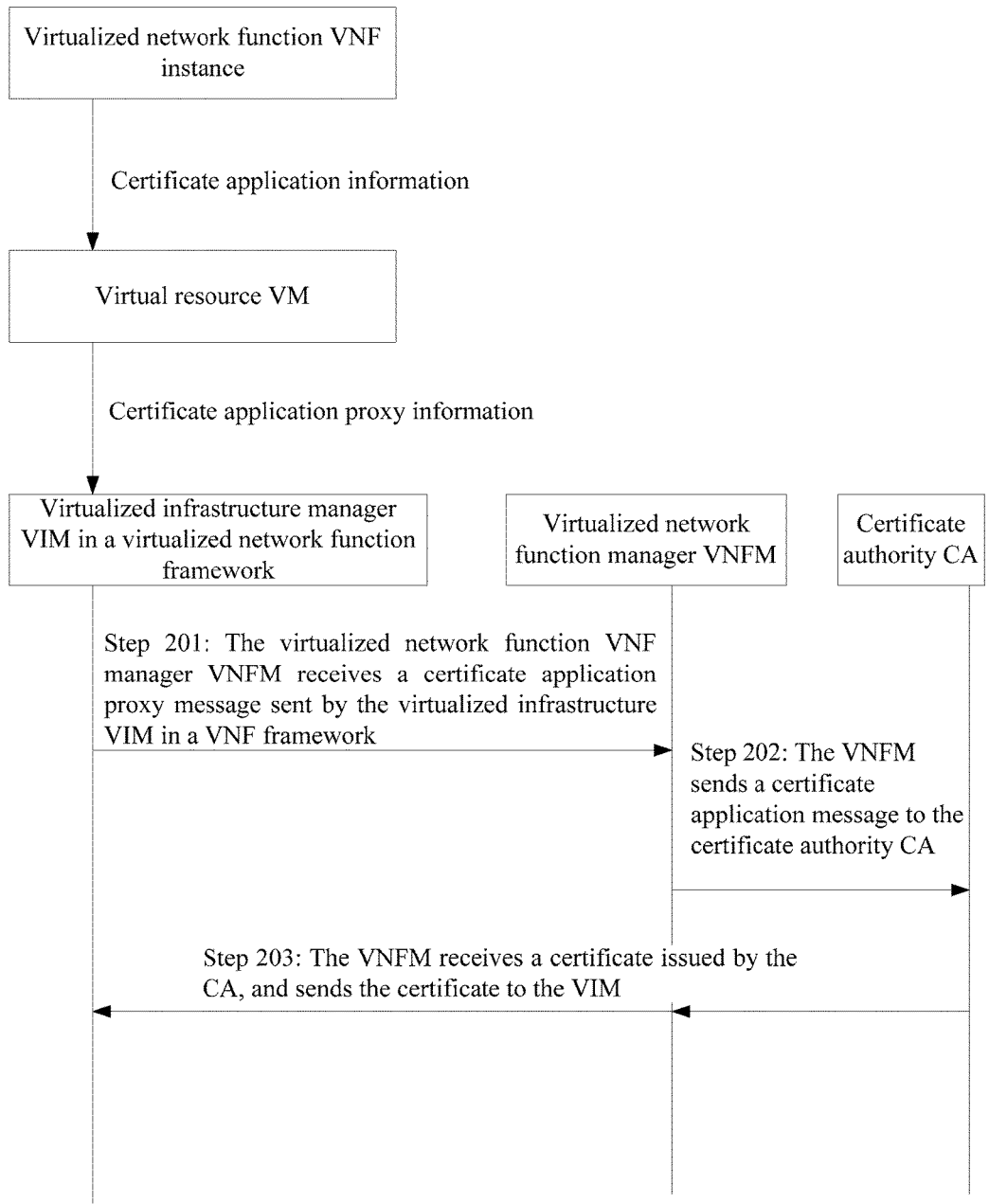
FIG. 2 is a schematic flowchart of a certificate acquiring method according to Embodiment 2 of the present invention.

As shown in FIG. 2, which is a schematic flowchart of a certificate acquiring method according to Embodiment 2 of the present invention, the method may be described as follows:

A precondition for implementing Embodiment 2 of the present invention is that an NFVO, a VIM, and an NFVI collaborate with each other to generate a VM and start and run a VNF instance on the VN.

It should be noted that a secure trusted link is established between the VM and the VIM.

The secure trusted link established between the VM and the VIM is detailed in the subsequent Embodiment 4, and is not described here.

Step 201: A virtualized network function VNF manager VNFM receives a certificate application proxy message sent by a virtualized infrastructure VIM in a VNF framework.

The certificate application proxy message includes a VNF instance that requests certificate application, and certificate application information used by the VNF instance for certificate application.

It should be noted that the certificate application information includes: a certificate format, a domain name, a certificate authority, and the like.

In step 201, in a virtual network, after the VNF is instantiated, it is necessary to apply for a certificate for the instantiated VNF instance in order to ensure security of communication between the instantiated VNF instance and other virtual network elements.

Specifically, when receiving an instruction to instantiate the VNF instance, an NFVO sends the instruction to instantiate the VNF to the VIM. The VIM sends the instruction to instantiate the VNF to the NFVI, and requests the NFVI to allocate a VM to the VNF instance to implement VNF instantiation.

The instruction to instantiate the VNF includes an initialization parameter of the VNF instance.

When allocating the VM to the VNF instance and implementing the VNF instantiation, the NFVI injects the initialization parameter of the VNF instance into the VNF instance, where the initialization parameter is included in the instruction to instantiate the VNF.

To ensure legality of a certificate that is applied for, the VNF instance applies for the certificate by using a certificate application proxy.

In this case, the VNF instance obtains the certificate application information according to the initialization parameter.

The initialization parameter includes CA information and a domain name of a certificate management domain.

In addition, the VNF instance generates a public-private key pair according to the initialization parameter.

A private key is stored locally in the VNF instance, and a public key is carried in the certificate application information and sent to a VM on which the VNF instance runs.

It should be noted that, because the VNF instance runs on the VM, it is determined that a trusted link is established between the VNF instance and the VM.

Because a secure trusted link is established between the VM and the VIM, when receiving the certificate application message sent by the VNF instance, the VM sends a certificate application proxy message to the VIM by using the secure channel to the VIM.

The certificate application proxy message includes the certificate application information that is used for certificate application.

When receiving the certificate application proxy message, the VIM forwards the certificate application proxy message to the VNFM, and the VNFM serves as a certificate application proxy and applies to a certificate authority (CA) for a certificate.

It should be noted that the VNFM establishes a trusted secure transmission channel to the certificate authority (CA) beforehand.

Step 202: The VNFM sends a certificate application message to a certificate authority (CA).

The certificate application message includes the certificate application information that is used for certificate application.

Step 203: The VNFM receives a certificate issued by the CA, and sends the certificate to the VIM.

The certificate is generated by the CA according to the certificate application information that is used for certificate application and included in the certificate application message.

In step 203, after the VNFM receives the certificate issued by the CA and sends the certificate to the VIM, the VIM uses a transmission channel to the VM to send the certificate to the VM, and then the VM sends the certificate to the VNF instance, so that the VNF instance authenticates the received certificate by using a locally stored private key, and when the authentication succeeds, uses the certificate to establish a management channel to the VNFM.

According to the solution in Embodiment 2 of the present invention, through a trusted secure transmission channel between a VM and a VIM, an instantiated VNF instance sends certificate application proxy information to a VNFM, and then through a trusted link between the VNFM and a certificate authority, applies for a certificate issued by the certificate authority, thereby effectively ensuring legality of the certificate applied for by the VNF instance and further ensuring security of a management channel that is established between the VNF instance and the VNFM by using the certificate issued by the certificate authority.

3. Embodiment 3

Figure 3:
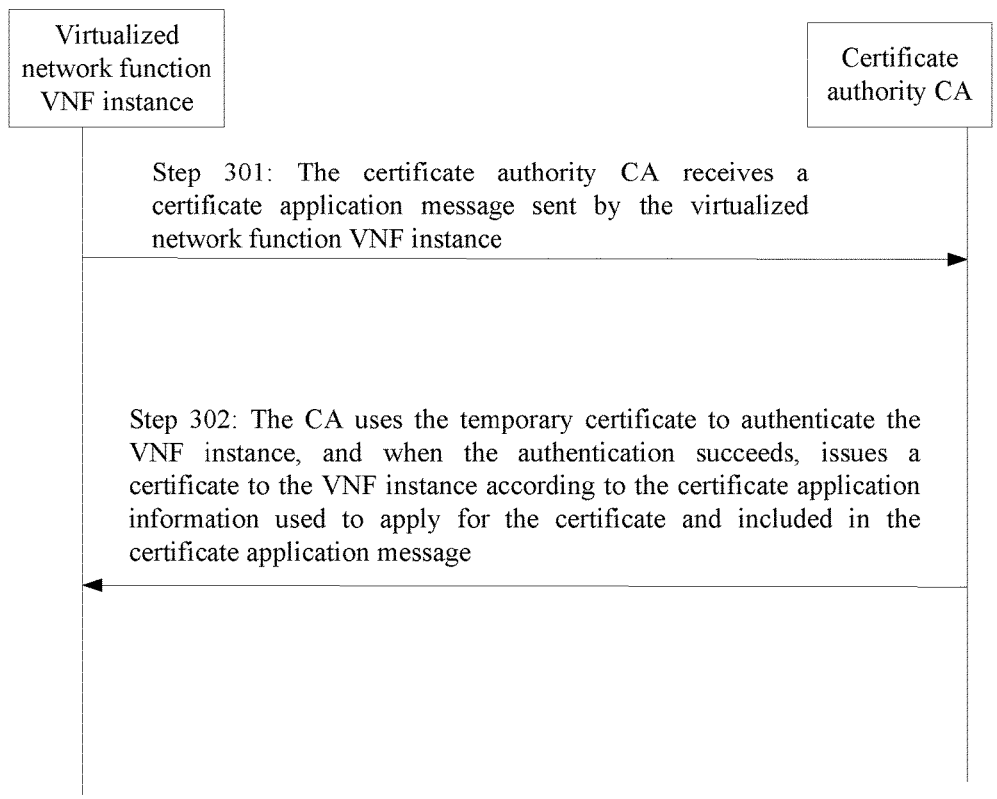
FIG. 3 is a schematic flowchart of a certificate acquiring method according to Embodiment 3 of the present invention.

As shown in FIG. 3, which is a schematic flowchart of a certificate acquiring method according to Embodiment 3 of the present invention, the method may be described as follows:

A precondition for implementing Embodiment 3 of the present invention is: when determining to instantiate a VNF instance, an NFVO applies to a certificate authority (CA) for a temporary certificate, where the temporary certificate is used by the VNF instance to apply for a legal certificate.

It should be noted that, in a process in which the NFVO determines to instantiate the VNF instance, a trusted transmission channel is established between the NFVO, a VIM, and an NFVI, so that the process of instantiating the VNF instance is protected against attacks and that the transmitted temporary certificate is protected against leakage.

Step 301: A certificate authority CA receives a certificate application message sent by a virtualized network function VNF instance.

The certificate application message includes a temporary certificate and certificate application information that is used for certificate application, where the temporary certificate is applied for from the CA when the network function virtualization orchestrator (NFVO) determines a need to instantiate the VNF instance and is transmitted to the VNF instance through a virtualized infrastructure manager (VIM) in a VNF framework, an NFV infrastructure (NFVI), and a virtual machine (VM) on which the VNF runs.

It should be noted that the certificate application information includes: a certificate format, a domain name, a certificate authority, and the like.

In step 301, in a virtual network, after the VNF is instantiated, it is necessary to apply for a certificate for the instantiated VNF instance in order to ensure security of communication between the instantiated VNF instance and other virtual network elements.

Specifically, when receiving an instruction to instantiate the VNF instance, an NFVO sends the instruction to instantiate the VNF to the VIM. The VIM sends the instruction to instantiate the VNF to the NFVI, and requests the NFVI to allocate a VM to the VNF instance to implement VNF instantiation.

The instruction to instantiate the VNF includes an initialization parameter of the VNF instance.

When allocating the VM to the VNF instance and implementing the VNF instantiation, the NFVI injects the initialization parameter of the VNF instance into the VNF instance, where the initialization parameter is included in the instruction to instantiate the VNF.

In this case, the VNF instance obtains the certificate application information according to the initialization parameter.

The initialization parameter includes CA information and a domain name of a certificate management domain, and is generated when the network function virtualization orchestrator (NFVO) determines to instantiate the VNF instance, and is injected when the NFVI allocates a VM to the VNF instance and finishes the VNF instantiation.

According to the initialization parameter, the VNF instance generates a public-private key pair used for certificate application.

A private key is stored locally in the VNF instance.

A public key is carried in the certificate application information and sent to the certificate authority (CA).

It should be noted that, according to the injected certificate authority (CA), the VNF instance uses a certificate application message to carry the temporary certificate and the certificate application information that is used for certificate application, and sends the certificate application message to the CA.

Step 302: The CA uses the temporary certificate to authenticate the VNF instance, and when the authentication succeeds, issues a certificate to the VNF instance according to the certificate application information that is used for certificate application and included in the certificate application message.

In step 302, when receiving the certificate application message, the CA authenticates the VNF instance by using the temporary certificate included in the certificate application message, and when the authentication succeeds, issues a certificate to the VNF instance according to the certificate application information that is used for certificate application and included in the certificate application message.

In this embodiment of the present invention, the method further includes:

using a locally stored private key to authenticate the received certificate after the VNF instance acquires the certificate, and when the authentication succeeds, using the certificate to establish a management channel to the VNFM.

According to the solution in Embodiment 3 of the present invention, by using a temporary certificate applied for when an NFVO determines to instantiate a VNF instance, an instantiated VNF instance establishes a trusted channel for certificate application between the instantiated VNF instance and a CA, thereby effectively ensuring legality of the certificate applied for by the VNF instance and further ensuring security of a management channel that is established between the VNF instance and a VNFM by using the certificate issued by the certificate authority.

4. Embodiment 4

Figure 4:
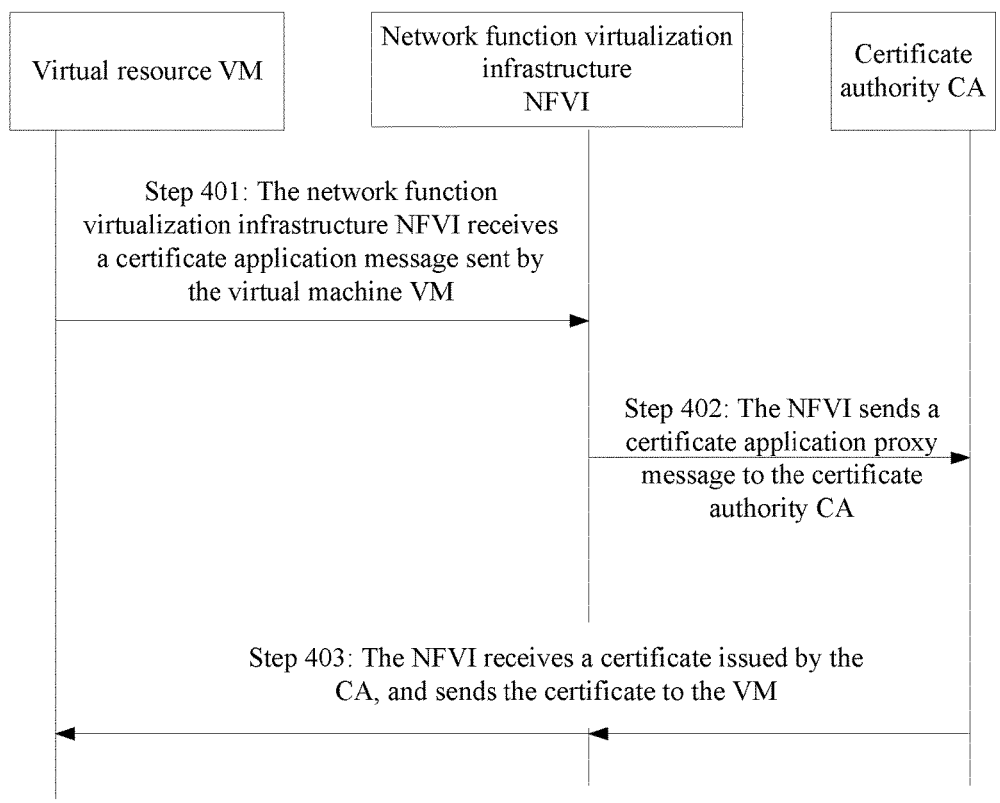
FIG. 4 is a schematic flowchart of a certificate acquiring method according to Embodiment 4 of the present invention.

As shown in FIG. 4, which is a schematic flowchart of a certificate acquiring method according to Embodiment 4 of the present invention, the method may be described as follows.

Embodiment 4 of the present invention specifically describes a method for establishing a management channel between a VM and a VMM or VIM.

Step 401: A network function virtualization infrastructure NFVI receives a certificate application message sent by a virtual machine VM.

The certificate application message includes the certificate application information that is used for certificate application.

It should be noted that the certificate application information includes: a certificate format, a domain name, a certificate authority, and the like.

In step 401, in a virtual network, after the VNF is instantiated, it is necessary to apply for a certificate for the instantiated VNF instance in order to ensure security of communication between the instantiated VNF instance and other virtual network elements.

Because a virtual resource VM on which the VFN instance runs is allocated when the VNF instance needs to be instantiated, a management channel between the VM and a VMM needs to be established after the VM is allocated, which ensures legality of the VM and thus enhances legality of the VNF instance.

Specifically, when receiving an instruction to instantiate the VNF instance, an NFVO sends the instruction to instantiate the VNF to the VIM. The VIM sends the instruction to instantiate the VNF to the NFVI, and requests the NFVI to allocate a VM to the VNF instance to implement VNF instantiation.

The NFVI allocates the VM to the VNF instance according to the instruction to instantiate the VNF.

The VIM sends, to the NFVI, information for requesting to allocate a virtual resource, where the information for requesting to allocate a virtual resource includes an initialization parameter for certificate application and the like.

After allocating the VM to the VNF instance according to the instruction to instantiate the VNF, the NFVI injects the initialization parameter for certificate application into the VM.

When started, the VM generates a public-private key pair according to the initialization parameter.

The initialization parameter includes CA information and a domain name of a certificate management domain and is obtained when the virtualized infrastructure manager (VIM) in the virtualized network function framework receives an instruction to generate the VM, where the instruction is sent by a network function virtualization orchestrator (NFVO).

A private key is stored locally in the VM, and a public key is used for certificate application and is carried in the certificate application information.

In this case, the VM sends a certificate application message to the NFVI.

Step 402: The NFVI sends a certificate application proxy message to a certificate authority CA.

The certificate application proxy message includes the certificate application information used by the VM for certificate application.

In step 402, manners of sending, by the NFVI, a certificate application proxy message to a certificate authority (CA) include but are not limited to:

First Manner:

A trusted transmission channel is established between the NFVI and the certificate authority (CA) beforehand, and in this case, the NFVI sends the certificate application proxy message to the certificate authority (CA) directly.

Second Manner:

A trusted transmission channel is established between the VIM and the certificate authority (CA) beforehand.

The NFVI sends a certificate application proxy message to the virtualized infrastructure manager (VIM) in a virtualized network function framework, so that the VIM forwards the certificate application proxy message to the certificate authority (CA).

Figure 5:
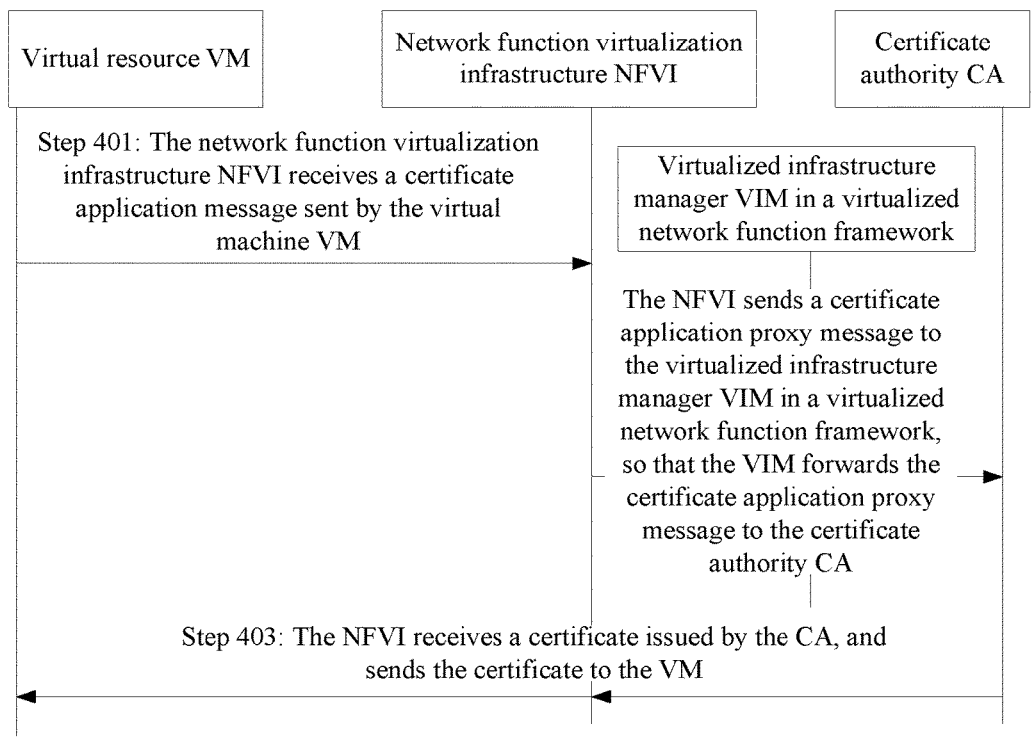
FIG. 5 is a schematic flowchart of a certificate acquiring method.

FIG. 5 is a schematic flowchart of a certificate acquiring method.

Specifically, the NFVI receives the certificate application message sent by the VM, generates a certificate application proxy message, and sends the certificate application proxy message to the VIM, and the VIM forwards the certificate application proxy message to the certificate authority (CA).

Step 403: The NFVI receives a certificate issued by the CA, and sends the certificate to the VM.

The certificate is generated by the CA according to the certificate application information used by the VM for certificate application and included in the certificate application proxy message.

In step 403, the method further includes:

authenticating, when the VM receives the certificate, the received certificate by using a locally stored private key, and when the authentication succeeds, establishes a management channel between the VM and the VM manager (VMM).

According to the solution in Embodiment 4 of the present invention, by means of a certificate application proxy, a VM applies for a legal certificate, and establishes a trusted transmission channel to a VMM or a VIM, thereby laying a foundation to ensure that a trusted management channel is established between a VNF instance and a VNFM by using a certificate issued by a certificate authority, and effectively enhancing security of a management channel between the VNF instance and the VNFM.

5. Embodiment 5

Figure 6:
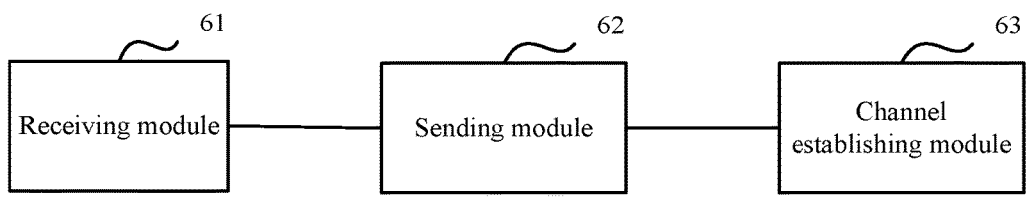
FIG. 6 is a schematic structural diagram of a certificate acquiring device according to Embodiment 5 of the present invention.

As shown in FIG. 6, which is a schematic structural diagram of a certificate acquiring device according to Embodiment 5 of the present invention, the device includes a receiving module 61 and a sending module 62.

The receiving module 61 is configured to receive a certificate application proxy message sent by a VNF instance, where the certificate application proxy message includes authentication information and certificate application information that is used for certificate application, where the authentication information is used to establish a channel for certificate proxy-application between the VNF instance and a virtualized network function manager (VNFM); and The sending module 62 is configured to use the authentication information received by the receiving module 61 to authenticate the VNF instance, and when the authentication succeeds, send a certificate application message to a certificate authority (CA), where the certificate application message includes the certificate application information that is used for certificate application, where the receiving module 61 is further configured to receive a certificate issued by the CA; and the sending module 62 is further configured to send the certificate received by the receiving module 61 to the VNF instance, where the certificate is generated by the CA according to the certificate application information that is used for certificate application and included in the certificate application message.

Optionally, the authentication information is a temporary certificate, where the temporary certificate is applied for from the VNFM when a network function virtualization orchestrator (NFVO) determines a need to instantiate the VNF instance and is transmitted to the VNF instance through a virtualized infrastructure manager (VIM) in a VNF framework, an NFV infrastructure (NFVI), and a virtual machine (VM) on which the VNF runs.

The sending module 62 is specifically configured to: compare a received temporary certificate with the temporary certificate that is applied for from the VNFM when the NFVO determines the need to instantiate the VNF instance; and when it is determined that the received temporary certificate is the same as the temporary certificate that is applied for from the VNFM when the NFVO determines the need to instantiate the VNF instance, determine that the authentication on the VNF instance succeeds; or when it is determined that the received temporary certificate is different from the temporary certificate that is applied for from the VNFM when the NFVO determines the need to instantiate the VNF instance, determine that the authentication on the VNF instance fails.

Optionally, the authentication information is a pre-shared key (PSK), where the PSK is generated when a network function virtualization orchestrator (NFVO) determines a need to instantiate the VNF instance and is transmitted to the VNF instance through a virtualized infrastructure manager (VIM) in a VNF framework, an NFV infrastructure (NFVI), and a virtual machine (VM) on which the VNF runs.

The receiving module 61 is specifically configured to send the PSK to the VNF instance and receive the certificate application proxy message sent by the VNF instance, where the certificate application proxy message is sent to the VNFM when the VNF instance determines that a locally injected PSK is the same as or associated with the received PSK sent by the VNFM.

The sending module 62 is specifically configured to: compare the received PSK with a PSK that is issued when the NFVO determines the need to instantiate the VNF instance; and when it is determined that the received PSK is the same as or associated with the PSK that is issued when the NFVO determines the need to instantiate the VNF instance, determine that the authentication on the VNF instance succeeds; or when it is determined that the received PSK is different from or unassociated with the PSK that is issued when the NFVO determines the need to instantiate the VNF instance, determine that the authentication on the VNF instance fails.

Optionally, the device further includes a channel establishing module 63, where:

the channel establishing module 63 is configured to: when the certificate is sent to the VNF instance, use the certificate to establish a management channel to the VNF instance.

It should be noted that the device according to this embodiment of the present invention may be a virtualized network function manager (VNFM) in a virtual system, and has a function of applying for a certificate by proxy for the VNF instance, and may be implemented in the form of hardware or software, which is not limited herein.

6. Embodiment 6

Figure 7:
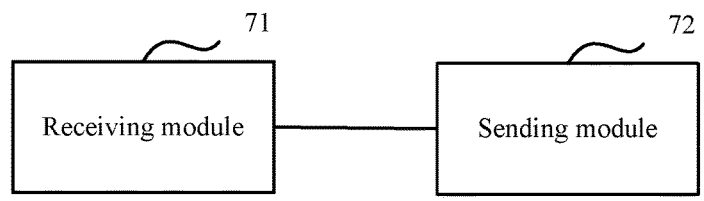
FIG. 7 is a schematic structural diagram of a certificate acquiring device according to Embodiment 6 of the present invention.

As shown in FIG. 7, which is a schematic structural diagram of a certificate acquiring device according to Embodiment 6 of the present invention, the device includes a receiving module 71 and a sending module 72.

The receiving module 71 is configured to receive a certificate application proxy message sent by a virtualized infrastructure manager (VIM) in a VNF framework, where the certificate application proxy message includes a VNF instance that requests certificate application, and certificate application information used by the VNF instance for certificate application; and the sending module 72 is configured to send a certificate application message to a certificate authority (CA), where the certificate application message includes the certificate application information received by the receiving module 71 and used by the VNF instance for certificate application, where the receiving module 71 is further configured to receive a certificate issued by the CA; and the sending module 72 is further configured to send the certificate received by the receiving module 71 to the VIM, where the certificate is generated by the CA according to the certificate application information used by the VNF instance for certificate application and included in the certificate application message.

Optionally, the certificate application proxy message is generated by the VIM according to the received certificate application information, where the certificate application information is obtained by the VNF instance according to an initialization parameter and sent by the VNF instance to a VM and then sent by the VM to the VIM through a secure channel to the VIM.

Optionally, the initialization parameter includes CA information and a domain name of a certificate management domain and is obtained when a network function virtualization orchestrator (NFVO) determines to instantiate the VNF instance.

It should be noted that the device according to this embodiment of the present invention may be a virtualized network function manager (VNFM) in a virtual system, and has a function of applying for a certificate by proxy for the VNF instance, and may be implemented in the form of hardware or software, which is not limited herein.

7. Embodiment 7

Figure 8:
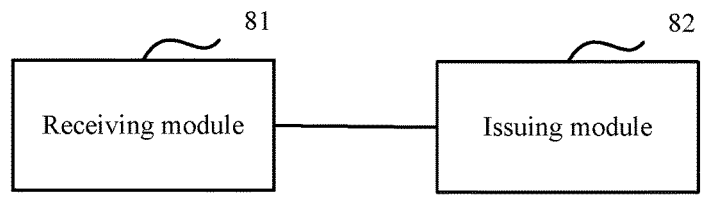
FIG. 8 is a schematic structural diagram of a certificate acquiring device according to Embodiment 7 of the present invention.

As shown in FIG. 8, which is a schematic structural diagram of a certificate acquiring device according to this embodiment of the present invention, the device includes a receiving module 81 and an issuing module 82, where:

the receiving module 81 is configured to receive a certificate application message sent by a virtualized network function VNF instance, where the certificate application message includes a temporary certificate and certificate application information that is used for certificate application, where the temporary certificate is applied for from a CA when a network function virtualization orchestrator (NFVO) determines a need to instantiate the VNF instance and is transmitted to the VNF instance through a virtualized infrastructure manager (VIM) in a VNF framework, an NFV infrastructure (NFVI), and a virtual machine (VM) on which the VNF runs; and the issuing module 82 is configured to use the temporary certificate received by the receiving module 81 to authenticate the VNF instance, and when the authentication succeeds, issue a certificate to the VNF instance according to the certificate application information that is used for certificate application and included in the certificate application message.

It should be noted that the device according to this embodiment of the present invention may be a certificate authority, and may be a CA or another device capable of authenticating a certificate, which is not limited herein; and the device may be implemented in the form of hardware or software, which is not limited herein.

8. Embodiment 8

Figure 9:
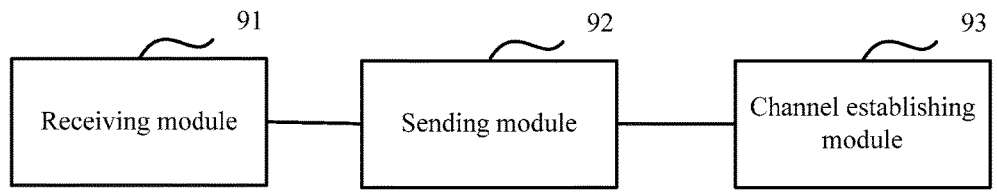
FIG. 9 is a schematic structural diagram of a certificate acquiring device according to Embodiment 8 of the present invention.

As shown in FIG. 9, which is a schematic structural diagram of a certificate acquiring device according to Embodiment 8 of the present invention, the device includes a receiving module 91 and a sending module 92, where:

the receiving module 91 is configured to receive a certificate application message sent by a virtual machine (VM), where the certificate application message includes a public key used for certificate application; and the sending module 92 is configured to send a certificate application proxy message to a certificate authority (CA), where the certificate application proxy message includes the public key received by the receiving module and used by the VM for certificate application, where the receiving module 91 is further configured to receive a certificate issued by the CA; and the sending module 92 is further configured to send the certificate received by the receiving module 91 to the VM, where the certificate is obtained by the CA by signing according to the public key used by the VM for certificate application and included in the certificate application proxy message.

Optionally, the sending module 92 is specifically configured to send the certificate application proxy message to a virtualized infrastructure manager (VIM) in a virtualized network function framework, so that the VIM forwards the certificate application proxy message to the certificate authority (CA).

Optionally, the device further includes a channel establishing module 93, where:

the channel establishing module 93 is configured to: when the VM receives the certificate, establish a management channel between the VM and a VM manager.

Optionally, the public key is generated by the VM according to an initialization parameter, where the initialization parameter includes CA information and a domain name of a certificate management domain and is obtained when the virtualized infrastructure manager (VIM) in the virtualized network function framework receives an instruction to generate the VM, where the instruction is sent by a network function virtualization orchestrator (NFVO).

It should be noted that, the device according to this embodiment of the present invention may be a network function virtualization infrastructure NFVI, and has a function of applying for a certificate by proxy for the VM, and may be implemented in the form of hardware or software, which is not limited herein.

9. Embodiment 9

Figure 10:
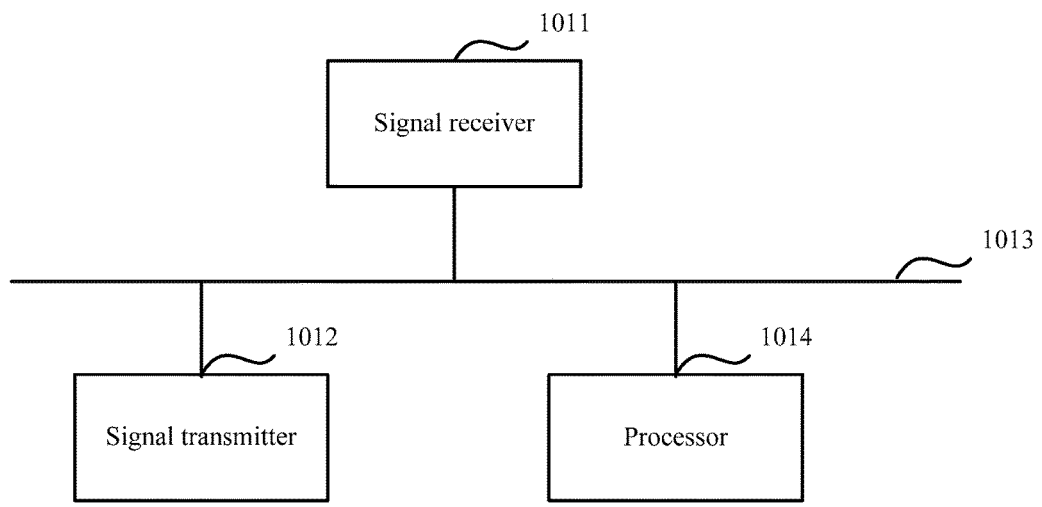
FIG. 10 is a schematic structural diagram of a certificate acquiring device according to Embodiment 9 of the present invention.

As shown in FIG. 10, which is a schematic structural diagram of a certificate acquiring device according to Embodiment 9 of the present invention, the device includes a signal receiver 1011 and a signal transmitter 1012, where the signal receiver 1011 and the signal transmitter 1012 communicate through a communications bus 1013.

The signal receiver 1011 is configured to receive a certificate application proxy message sent by a VNF instance, where the certificate application proxy message includes authentication information and certificate application information that is used for certificate application, where the authentication information is used to establish a channel for certificate proxy-application between the VNF instance and a virtualized network function manager (VNFM).

The signal transmitter 1012 is configured to use the authentication information to authenticate the VNF instance, and when the authentication succeeds, send a certificate application message to a certificate authority (CA), where the certificate application message includes the certificate application information that is used for certificate application.

The signal receiver 1011 is further configured to receive a certificate issued by the CA.

The signal transmitter 1012 is further configured to send the certificate to the VNF instance, where the certificate is generated by the CA according to the certificate application information that is used for certificate application and included in the certificate application message.

Optionally, the authentication information is a temporary certificate, where the temporary certificate is applied for from the VNFM when a network function virtualization orchestrator (NFVO) determines a need to instantiate the VNF instance and is transmitted to the VNF instance through a virtualized infrastructure manager (VIM) in a VNF framework, an NFV infrastructure (NFVI), and a virtual machine (VM) on which the VNF runs.

The signal transmitter 1012 is specifically configured to: compare a received temporary certificate with the temporary certificate that is applied for from the VNFM when the NFVO determines the need to instantiate the VNF instance; and when the VNFM determines that the received temporary certificate is the same as the temporary certificate that is applied for from the VNFM when the NFVO determines the need to instantiate the VNF instance, determine that the authentication on the VNF instance succeeds; or when the VNFM determines that the received temporary certificate is different from the temporary certificate that is applied for from the VNFM when the NFVO determines the need to instantiate the VNF instance, determine that the authentication on the VNF instance fails.

Optionally, the authentication information is a pre-shared key (PSK), where the PSK is generated when a network function virtualization orchestrator (NFVO) determines a need to instantiate the VNF instance and is transmitted to the VNF instance through a virtualized infrastructure manager (VIM) in a VNF framework, an NFV infrastructure (NFVI), and a virtual machine (VM) on which the VNF runs.

The signal receiver 1011 is specifically configured to send the PSK to the VNF instance and receive the certificate application proxy message sent by the VNF instance, where the certificate application proxy message is sent to the VNFM when the VNF instance determines that a locally injected PSK is the same as or associated with the received PSK.

The signal transmitter 1012 is specifically configured to: compare the received PSK with a PSK that is issued when the NFVO determines the need to instantiate the VNF instance; and when it is determined that the received PSK is the same as or associated with the PSK that is issued when the NFVO determines the need to instantiate the VNF instance, determine that the authentication on the VNF instance succeeds; or when it is determined that the received PSK is different from or unassociated with the PSK that is issued when the NFVO determines the need to instantiate the VNF instance, determine that the authentication on the VNF instance fails.

Optionally, the device further includes a processor 1014, where:

the processor 1014 is configured to: when the certificate is sent to the VNF instance, use the certificate to establish a management channel to the VNF instance.

The processor 1014 may be a general-purpose central processing unit (CPU), a microprocessor, an application specific integrated circuit (ASIC), or one or more integrated circuits used to control execution of a program of the solution in this embodiment of the present invention.

The communications bus 1013 may include a path for transmitting information between the foregoing components.

It should be noted that the device according to this embodiment of the present invention may be a virtualized network function manager (VNFM) in a virtual system, and has a function of applying for a certificate by proxy for the VNF instance, and may be implemented in the form of hardware or software, which is not limited herein.

10. Embodiment 10

Figure 11:
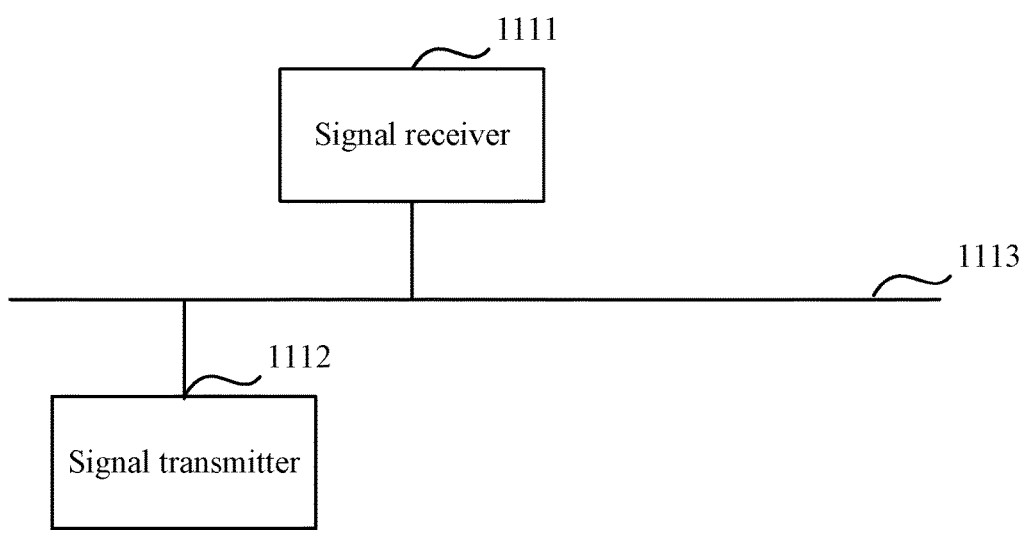
FIG. 11 is a schematic structural diagram of a certificate acquiring device according to Embodiment 10 of the present invention.

As shown in FIG. 11, which is a schematic structural diagram of a certificate acquiring device according to Embodiment 10 of the present invention, the device includes a signal receiver 1111 and a signal transmitter 1112, where the signal receiver 1111 and the signal transmitter 1112 are connected through a communications bus 1113.

The signal receiver 1111 is configured to receive a certificate application proxy message sent by a virtualized infrastructure manager (VIM) in a VNF framework, where the certificate application proxy message includes a VNF instance that requests certificate application, and certificate application information used by the VNF instance for certificate application.

The signal transmitter 1112 is configured to send a certificate application message to a certificate authority (CA), where the certificate application message includes the certificate application information used by the VNF instance for certificate application.

The signal receiver 1111 is further configured to receive a certificate issued by the CA.

The signal transmitter 1112 is further configured to send the certificate to the VIM, where the certificate is generated by the CA according to the certificate application information used by the VNF instance for certificate application and included in the certificate application message.

Optionally, the certificate application proxy message is generated by the VIM according to the received certificate application information, where the certificate application information is obtained by the VNF instance according to an initialization parameter and sent by the VNF instance to a VM and then sent by the VM to the VIM through a secure channel to the VIM.

Optionally, the initialization parameter includes CA information and a domain name of a certificate management domain and is obtained when a network function virtualization orchestrator (NFVO) determines to instantiate the VNF instance.

It should be noted that the device according to this embodiment of the present invention may be a virtualized network function manager (VNFM) in a virtual system, and has a function of applying for a certificate by proxy for the VNF instance, and may be implemented in the form of hardware or software, which is not limited herein.

11. Embodiment 11

Figure 12:
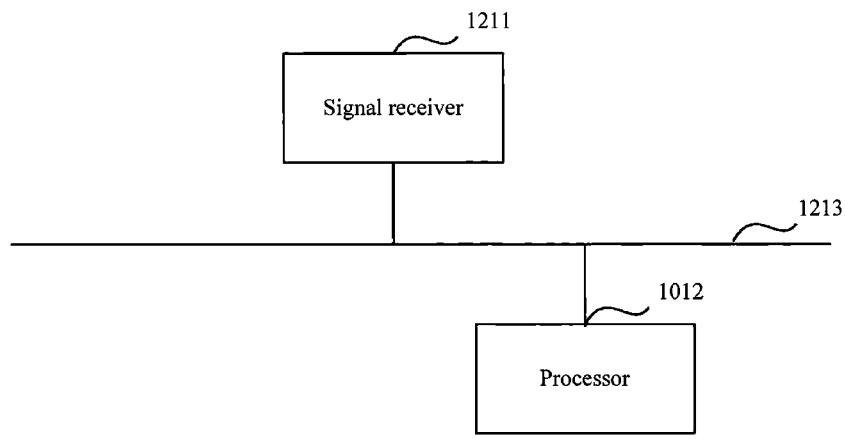
FIG. 12 is a schematic structural diagram of a certificate acquiring device according to Embodiment 11 of the present invention.

As shown in FIG. 12, which is a schematic structural diagram of a certificate acquiring device according to Embodiment 11 of the present invention, the device includes a signal receiver 1211 and a processor 1212, where the signal receiver 1211 and the processor 1212 are connected through a communications bus 1213.

The signal receiver 1211 is configured to receive a certificate application message sent by a virtualized network function VNF instance, where the certificate application message includes a temporary certificate and certificate application information that is used for certificate application, where the temporary certificate is applied for from a CA when a network function virtualization orchestrator (NFVO) determines a need to instantiate the VNF instance and is transmitted to the VNF instance through a virtualized infrastructure manager (VIM) in a VNF framework, an NFV infrastructure (NFVI), and a virtual machine (VM) on which the VNF runs.

The processor 1212 is configured to use the temporary certificate to authenticate the VNF instance, and when the authentication succeeds, issue a certificate to the VNF instance according to the certificate application information that is used for certificate application and included in the certificate application message.

The processor 1212 may be a general-purpose central processing unit (CPU), a microprocessor, an application specific integrated circuit (ASIC), or one or more integrated circuits used to control execution of a program of the solution in this embodiment of the present invention.

The communications bus 1213 may include a path for transmitting information between the foregoing components.

It should be noted that the device according to this embodiment of the present invention may be a certificate authority, and may be a CA or another device capable of authenticating a certificate, which is not limited herein; and the device may be implemented in the form of hardware or software, which is not limited herein.

12. Embodiment 12

Figure 13:
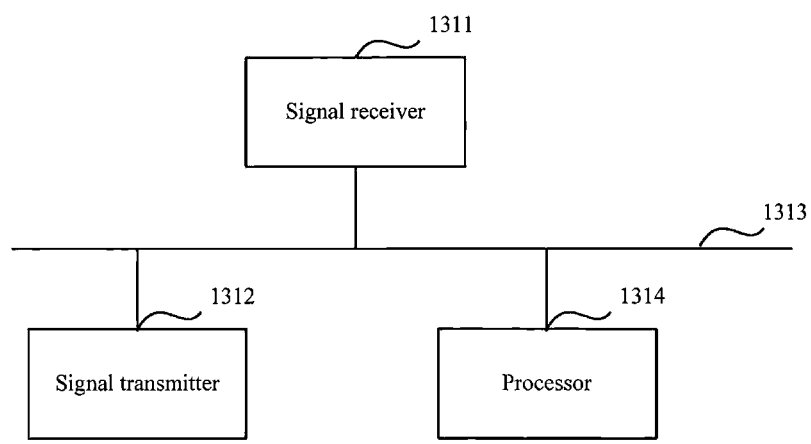
FIG. 13 is a schematic structural diagram of a certificate acquiring device according to Embodiment 12 of the present invention.

As shown in FIG. 13, which is a schematic structural diagram of a certificate acquiring device according to Embodiment 12 of the present invention, the device includes a signal receiver 1311 and a signal transmitter 1312, where the signal receiver 1311 and the signal transmitter 1312 are connected through a communications bus 1313.

The signal receiver 1311 is configured to receive a certificate application message sent by a virtual machine (VM), where the certificate application message includes a public key used for certificate application.

The signal transmitter 1312 is configured to send a certificate application proxy message to a certificate authority (CA), where the certificate application proxy message includes the public key used by the VM for certificate application.

The signal receiver 1311 is further configured to receive a certificate issued by the CA.

The signal transmitter 1312 is further configured to send the certificate to the VM, where the certificate is obtained by the CA by signing according to the public key used by the VM for certificate application and included in the certificate application proxy message.

Specifically, the signal transmitter 1312 is specifically configured to send the certificate application proxy message to a virtualized infrastructure manager (VIM) in a virtualized network function framework, so that the VIM forwards the certificate application proxy message to the certificate authority (CA).

Optionally, the device further includes a processor 1314, where:

the processor 1314 is configured to: when the VM receives the certificate, establish a management channel between the VM and a VM manager.

Optionally, the public key is generated by the VM according to an initialization parameter, where the initialization parameter includes CA information and a domain name of a certificate management domain and is obtained when the virtualized infrastructure manager (VIM) in the virtualized network function framework receives an instruction to generate the VM, where the instruction is sent by a network function virtualization orchestrator (NFVO).

The processor 1314 may be a general-purpose central processing unit (CPU), a microprocessor, an application specific integrated circuit (ASIC), or one or more integrated circuits used to control execution of a program of the solution in this embodiment of the present invention.

The communications bus 1313 may include a path for transmitting information between the foregoing components.

It should be noted that the device according to this embodiment of the present invention may be a network function virtualization infrastructure NFVI, and has a function of applying for a certificate by proxy for the VM, and may be implemented in the form of hardware or software, which is not limited herein.

A person skilled in the art should understand that the embodiments of the present invention may be provided as a method, an apparatus (device), or a computer program product. Therefore, the present invention may use a form of hardware only embodiments, software only embodiments, or embodiments with a combination of software and hardware. Moreover, the present invention may use a form of a computer program product that is implemented on one or more computer-usable storage media (including but not limited to a disk memory, a compact disc read-only memory (CD-ROM), an optical memory, and the like) that include computer-usable program code.

The present invention is described with reference to the flowcharts and/or block diagrams of the method, the apparatus (device), and the computer program product according to the embodiments of the present invention. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may also be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may also be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although some preferred embodiments of the present invention have been described, persons skilled in the art can make changes and modifications to these embodiments once they learn the basic inventive concept. Therefore, the following claims are intended to be construed as to cover the preferred embodiments and all changes and modifications falling within the scope of the present invention.

A person skilled in the art can make various modifications and variations to the present invention without departing from the spirit and scope of the present invention. The present invention is intended to cover these modifications and variations provided that they fall within the scope of protection defined by the following claims and their equivalent technologies

What is claimed is:

1. A certificate acquiring device, comprising a processor and a non-transitory computer-readable storage medium including computer-executable instructions executed by the processor to perform, operations comprising:
   receiving a certificate application proxy message sent by a virtualized network function (VNF) instance, wherein the certificate application proxy message comprises authentication information and certificate application information that is used for certificate application, wherein the authentication information is used to establish a channel for certificate proxy-application between the VNF instance and a virtualized network function manager (VNFM);
   using the authentication information to authenticate the VNF instance;
   when the authentication succeeds, sending a certificate application message to a certificate authority (CA), wherein the certificate application message comprises the certificate application information that is used for certificate application;
   receiving a certificate issued by the CA; and
   sending the certificate to the VNF instance, wherein the certificate is generated by the CA according to the certificate application information that is used for certificate application and comprised in the certificate application message.

2. The device according to claim 1, wherein the authentication information is a temporary certificate applied for from the VNFM when a network function virtualization orchestrator (NFVO) determines a need to instantiate the VNF instance and transmitted to the VNF instance through a virtualized infrastructure manager (VIM) in a VNF framework, a network function virtualization infrastructure (NFVI), and a virtual machine (VM) on which the VNF runs.

3. The device according to claim 2, wherein the operations further comprise:
   comparing a received temporary certificate with the temporary certificate that is applied for from the VNFM when the NFVO determines the need to instantiate the VNF instance; and
   when the VNFM determines that the received temporary certificate is the same as the temporary certificate that is applied for from the VNFM when the NFVO determines the need to instantiate the VNF instance, determining that the authentication on the VNF instance succeeds.

4. The device according to claim 1, wherein the authentication information is a pre-shared key (PSK), wherein the PSK is generated when a network function virtualization orchestrator (NFVO) determines a need to instantiate the VNF instance and is transmitted to the VNF instance through a virtualized infrastructure manager (VIM) in a VNF framework, a network function virtualization infrastructure (NFVI), and a virtual machine (VM) on which the VNF runs.

5. The device according to claim 4, wherein the operations further comprise:
   sending the PSK to the VNF instance and receiving the certificate application proxy message sent by the VNF instance, wherein the certificate application proxy message is sent to the VNFM when the VNF instance determines that a locally injected PSK is the same as or associated with the received PSK.

6. A certificate acquiring device, comprising a processor and a non-transitory computer-readable storage medium including computer-executable instructions executed by the processor to perform, operations comprising:
   receiving a certificate application proxy message sent by a virtualized infrastructure manager (VIM) in a virtualized network function (VNF) framework, wherein the certificate application proxy message comprises a VNF instance that requests certificate application, and certificate application information used by the VNF instance for certificate application;
   sending a certificate application message to a certificate authority (CA), wherein the certificate application message comprises the certificate application information used by the VNF instance for certificate application;
   receiving a certificate issued by the CA; and
   sending the certificate to the VIM, wherein the certificate is generated by the CA according to the certificate application information used by the VNF instance for certificate application and comprised in the certificate application message.

7. The device according to claim 6, wherein the certificate application proxy message is generated by the VIM according to the received certificate application information, wherein the certificate application information is obtained by the VNF instance according to an initialization parameter and sent by the VNF instance to a virtual machine (VM) and then sent by the VM to the VIM through a secure channel to the VIM.

8. The device according to claim 7, wherein the initialization parameter comprises CA information and a domain name of a certificate management domain and is obtained when a network function virtualization orchestrator (NFVO) determines to instantiate the VNF instance.

9. A certificate acquiring method, comprising:
   receiving, by a virtualized network function manager (VNFM), a certificate application proxy message sent by a virtualized network function (VNF) instance, wherein the certificate application proxy message comprises authentication information and certificate application information that is used for certificate application, wherein the authentication information is used to establish a channel for certificate proxy-application between the VNF instance and the VNFM;
   using, by the VNFM, the authentication information to authenticate the VNF instance, and when the authentication succeeds, sending a certificate application message to a certificate authority (CA), wherein the certificate application message comprises the certificate application information that is used for certificate application; and
   receiving, by the VNFM, a certificate issued by the CA, and sending the certificate to the VNF instance, wherein the certificate is generated by the CA according to the certificate application information that is used for certificate application and comprised in the certificate application message.

10. The method according to claim 9, wherein the authentication information is a temporary certificate, wherein the temporary certificate is applied for from the VNFM when a network function virtualization orchestrator (NFVO) determines a need to instantiate the VNF instance and is transmitted to the VNF instance through a virtualized infrastructure manager (VIM) in a VNF framework, a network function virtualization infrastructure (NFVI), and a virtual machine (VM) on which the VNF runs.

11. The method according to claim 10, wherein the using, by the VNFM, the authentication information to authenticate the VNF instance comprises:
comparing, by the VNFM, a received temporary certificate with the temporary certificate that is applied for from the VNFM when the NFVO determines the need to instantiate the VNF instance; and
when the VNFM determines that the received temporary certificate is the same as the temporary certificate that is applied for from the VNFM when the NFVO determines the need to instantiate the VNF instance, determining that the authentication on the VNF instance succeeds.

12. The method according to claim 9, wherein the authentication information is a pre-shared key (PSK), wherein the PSK is generated when a network function virtualization orchestrator (NFVO) determines a need to instantiate the VNF instance and is transmitted to the VNF instance through a virtualized infrastructure manager (VIM) in a VNF framework, a network function virtualization infrastructure (NFVI), and a virtual machine (VM) on which the VNF runs.

13. The method according to claim 12, wherein the receiving, by a virtualized network function manager (VNFM), a certificate application proxy message sent by a VNF instance comprises:
sending, by the VNFM, the PSK to the VNF instance, and receiving the certificate application proxy message sent by the VNF instance, wherein the certificate application proxy message is sent to the VNFM when the VNF instance determines that a locally injected PSK is the same as or associated with the received PSK sent by the VNFM.

14. A certificate acquiring method, comprising:
receiving, by a virtualized network function manager (VNFM), a certificate application proxy message sent by a virtualized infrastructure manager (VIM) in a virtualized network function (VNF) framework, wherein the certificate application proxy message comprises a VNF instance that requests certificate application, and certificate application information used by the VNF instance for certificate application;
sending, by the VNFM, a certificate application message to a certificate authority (CA), wherein the certificate application message comprises the certificate application information used by the VNF instance for certificate application; and
receiving, by the VNFM, a certificate issued by the CA, and sending the certificate to the VIM, wherein the certificate is generated by the CA according to the certificate application information used by the VNF instance for certificate application and comprised in the certificate application message.

15. The method according to claim 14, wherein the certificate application proxy message is generated by the VIM according to the received certificate application information, wherein the certificate application information is obtained by the VNF instance according to an initialization parameter and sent by the VNF instance to a virtual machine (VM) and then sent by the VM to the VIM through a secure channel to the VIM.

16. The method according to claim 15, wherein the initialization parameter comprises CA information and a domain name of a certificate management domain and is obtained when a network function virtualization orchestrator (NFVO) determines to instantiate the VNF instance.

* * * * *